United States Patent
Fry

(10) Patent No.: US 9,093,076 B2
(45) Date of Patent: Jul. 28, 2015

(54) MULTIPASS ASR CONTROLLING MULTIPLE APPLICATIONS

(75) Inventor: Darrin Kenneth Fry, Kanata (CA)

(73) Assignee: 2236008 Ontario Inc., Waterloo, Ontario, CA (US)

( * ) Notice: Subject to any disclaimer, the term of this patent is extended or adjusted under 35 U.S.C. 154(b) by 287 days.

(21) Appl. No.: 13/460,443

(22) Filed: Apr. 30, 2012

(65) Prior Publication Data
US 2013/0289996 A1    Oct. 31, 2013

(51) Int. Cl.
| G10L 15/00 | (2013.01) |
| G10L 15/32 | (2013.01) |
| G10L 15/19 | (2013.01) |

(52) U.S. Cl.
CPC *G10L 15/32* (2013.01); *G10L 15/19* (2013.01)

(58) Field of Classification Search
CPC ....................................................... G10L 15/32
USPC ........................................ 704/231, 235, 252
See application file for complete search history.

(56) References Cited

U.S. PATENT DOCUMENTS

| 5,754,978 | A * | 5/1998 | Perez-Mendez et al. ..... 704/255 |
| 6,434,523 | B1 | 8/2002 | Monaco |
| 6,609,093 | B1 | 8/2003 | Gopinath et al. |
| 6,757,652 | B1 * | 6/2004 | Lund et al. .................... 704/254 |
| 6,879,956 | B1 | 4/2005 | Honda et al. |
| 6,898,567 | B2 * | 5/2005 | Balasuriya .................... 704/231 |
| 7,184,957 | B2 * | 2/2007 | Brookes et al. ............... 704/246 |
| 7,340,395 | B2 * | 3/2008 | Gurram et al. ................ 704/231 |
| 7,840,399 | B2 * | 11/2010 | Suontausta et al. ............... 704/8 |
| 8,180,641 | B2 * | 5/2012 | Levit et al. .................... 704/255 |
| 8,244,533 | B2 * | 8/2012 | Kiuchi et al. ................. 704/253 |
| 8,370,159 | B2 * | 2/2013 | Lee et al. .................... 704/270.1 |
| 2001/0041980 | A1 | 11/2001 | Howard et al. |
| 2002/0046023 | A1 * | 4/2002 | Fujii et al. .................... 704/231 |
| 2002/0133346 | A1 * | 9/2002 | Kemble et al. ............... 704/257 |
| 2002/0194000 | A1 * | 12/2002 | Bennett et al. ............... 704/270 |
| 2003/0101054 | A1 | 5/2003 | Davis et al. |
| 2003/0236664 | A1 * | 12/2003 | Sharma .......................... 704/251 |
| 2004/0117179 | A1 * | 6/2004 | Balasuriya .................... 704/231 |

(Continued)

FOREIGN PATENT DOCUMENTS

| EP | 1796080 | 6/2007 |
| EP | 1 912 205 | 4/2008 |

(Continued)

OTHER PUBLICATIONS

Extended European Search Report in EP application 13173119.2-1910, dated Aug. 12, 2013, pp. 1-5.

(Continued)

*Primary Examiner* — Douglas Godbold
(74) *Attorney, Agent, or Firm* — Brinks Gilson & Lione

(57) ABSTRACT

A multipass processing system includes a first grammar-based speech recognition system that compares a spoken utterance to a sub-grammar. The sub-grammar includes keywords or key phrases from active grammars that each uniquely identifies one of many application engines. The first grammar-based speech recognition system generates a first grammar-based speech recognition result and a first grammar-based confidence score. A demultiplexer receives the spoken utterance through an input. The demultiplexer transmits the spoken utterance to one of many other grammar-based speech recognition systems based on the first grammar-based speech recognition-result.

21 Claims, 5 Drawing Sheets

(56) References Cited

U.S. PATENT DOCUMENTS

| | | |
|---|---|---|
| 2004/0186714 A1 | 9/2004 | Baker |
| 2004/0210437 A1* | 10/2004 | Baker .......................... 704/251 |
| 2005/0038654 A1* | 2/2005 | Emonts et al. ................ 704/256 |
| 2005/0075881 A1 | 4/2005 | Rigazio et al. |
| 2005/0108010 A1 | 5/2005 | Frankel et al. |
| 2005/0288935 A1 | 12/2005 | Lee et al. |
| 2006/0080105 A1* | 4/2006 | Lee et al. ................... 704/270.1 |
| 2006/0206331 A1* | 9/2006 | Hennecke et al. ............ 704/254 |
| 2007/0055525 A1 | 3/2007 | Kennewick et al. |
| 2007/0118364 A1 | 5/2007 | Wise et al. |
| 2008/0133220 A1* | 6/2008 | Paek et al. ........................ 704/9 |
| 2009/0018833 A1 | 1/2009 | Kozat et al. |
| 2009/0150156 A1 | 6/2009 | Kennewick et al. |
| 2009/0204409 A1 | 8/2009 | Mozer et al. |
| 2009/0287486 A1* | 11/2009 | Chang .......................... 704/235 |
| 2010/0082343 A1* | 4/2010 | Levit et al. ................... 704/257 |
| 2010/0114577 A1 | 5/2010 | Hayn et al. |
| 2010/0191530 A1 | 7/2010 | Nakano et al. |
| 2010/0217604 A1 | 8/2010 | Baldwin et al. |
| 2010/0312546 A1* | 12/2010 | Chang et al. ..................... 704/9 |
| 2011/0022292 A1 | 1/2011 | Shen et al. |
| 2011/0029311 A1* | 2/2011 | Minamino et al. ............ 704/243 |
| 2012/0084086 A1* | 4/2012 | Gilbert et al. ................. 704/235 |
| 2012/0179464 A1* | 7/2012 | Newman et al. .............. 704/231 |

FOREIGN PATENT DOCUMENTS

| | | |
|---|---|---|
| EP | 2034472 | 3/2009 |
| WO | WO 2009/145796 | 12/2009 |

OTHER PUBLICATIONS

Extended European Search Report in EP application 13173059.0-1910, dated Aug. 12, 2013, pp. 1-6.

European Examination Report issued in corresponding EP application 12166308.2-1901, issued Jan. 12, 2015, pp. 1-5.

EP Extended Search report in EP Application 12166312.4-1901, dated May 31, 2013, pp. 1-10.

Extended European Search Report in EP application 12166308.2-1901, dated Jul. 5, 2013, pp. 1-9.

Office Action issued in corresponding Canadian Application No. 2,814,300, dated Jan. 13, 2015, pp. 1-6.

Fiscus, Jonathan G., "A Post-Processing System to Yield Reduced Word Error Rates: Recognizer Output Voting Error Reduction," IEEE Workshop on Automatic Speech Recognition and Understanding, 1997, pp. 347-354.

* cited by examiner

MULTIPASS ASR CONTROLLING MULTIPLE APPLICATIONS

RELATED APPLICATION

This disclosure relates to U.S. patent application Ser. No. 13/460,443 titled "Post Processing of Natural Language ASR" filed the same day as this disclosure (Apr. 30, 2012), the contents of which are incorporated herein by reference.

BACKGROUND OF THE INVENTION

1. Technical Field

This disclosure also relates to voice recognition and more particularly to a stateless and more accurate automatic speech recognition technology that requires a small memory footprint.

2. Related Art

Automatic Speech Recognition (ASR) attempts to determine what words, phrases, or sentences are spoken. Some applications focus on broad applications that require large memory footprints to hold large vocabularies. Such systems require substantial amounts of processing.

Despite the substantial resources devoted to ASR, some technology is subject to significant error rates. Few interactions or spoken utterances may be recognized at the sentence-level, with only slight improvements at the word level because the larger vocabularies may lead to more frequent mismatches. As the automatic speech recognizers are elevated to portable applications accuracy will be of utmost importance especially when needed to resolve urgent conditions that require immediate attention (e.g., an emergency call) or when used to prescribe medications or when used to register a level of acuity in a health care assessment through devices that by their very nature have a small memory footprint.

SUMMARY

A multipass processing system includes a first grammar-based speech recognition system that compares a spoken utterance to a sub-grammar. The sub-grammar includes keywords or key phrases from active grammars that each uniquely identifies one of many application engines. The first grammar-based speech recognition system generates a first grammar-based speech recognition result and a first grammar-based confidence score. A demultiplexer receives the spoken utterance through an input. The demultiplexer transmits the spoken utterance to one of many other grammar-based speech recognition systems based on the first grammar-based speech recognition-result.

Other systems, methods, features, and advantages of the inventions will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The inventions can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
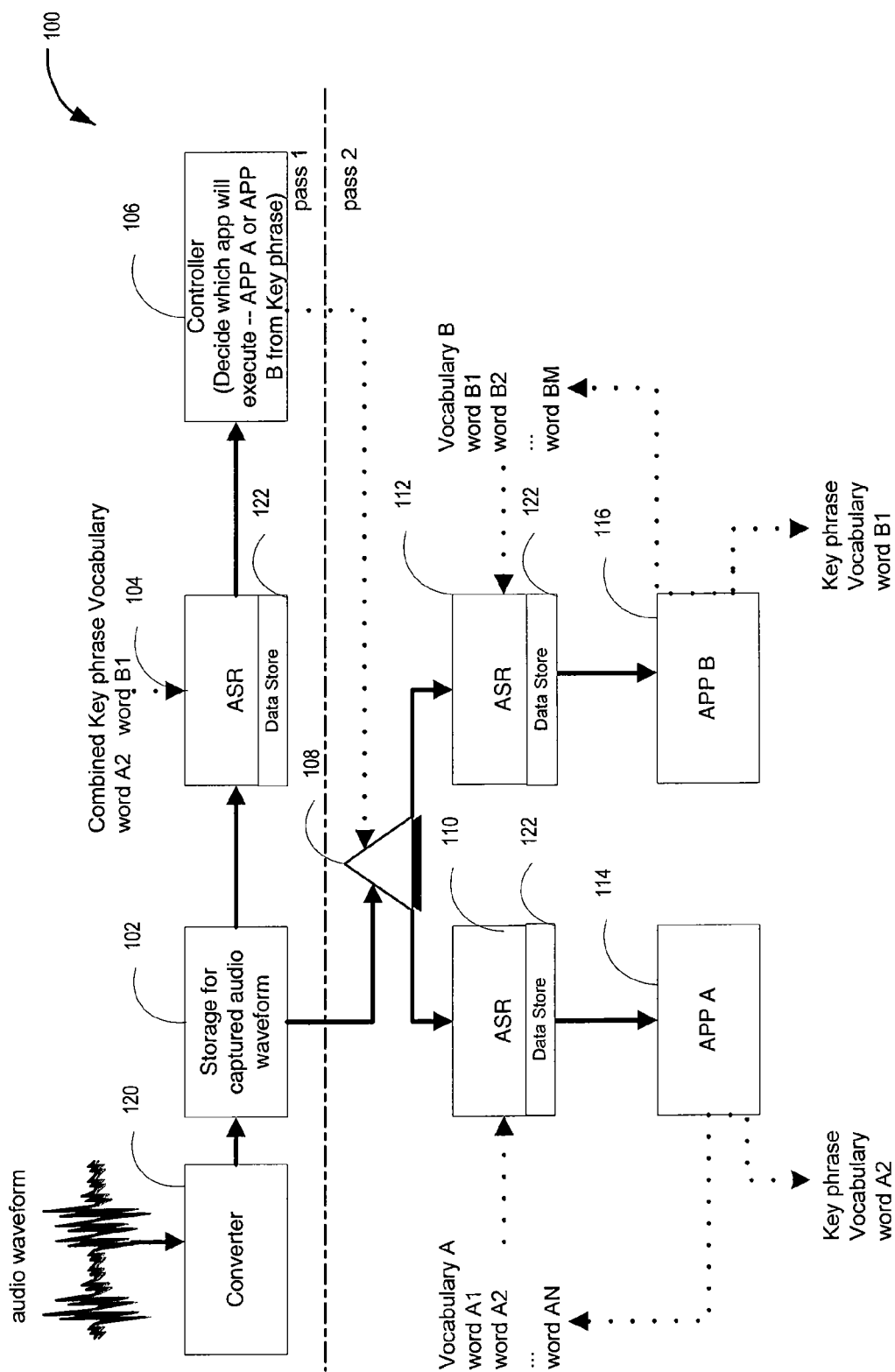
FIG. 1 is a block diagram of a multipass ASR system.

This detailed description describes multipass-processing and a multipass system that delivers a more accurate grammar-based ASR recognition result from a limited grammar. The recognition result may comprise indicia, symbols, objects, or other agnostic representations that may interface any device that may select one of many grammar-based ASRs. The ASR system includes a real-time multipass processing that processes audio files through a grammar-based ASR using a reduced grammar made up of keywords and/or key phrases that are unique to different applications and/or subsystems that the ASR is associated with. The keywords and/or key phrases may be used as a reference for finding other words and phrases. The recognition results may control a demultiplexer that receives the captured speech utterance from an intermediate repository and delivers them to one or more grammar-based ASRs. A speech utterance may be a single word, an entire phrase, a sentence, or even several sentences. The multipass system is accurate, secure, robust, and scalable to audio-only and multi-modal systems (e.g., systems that process other sources of information besides audio).

Some multipass systems improve speech recognition through entirely-grammar based ASRs that process speech through comparisons to multiple grammars. In a first pass a speech engine receives frames of a spoken utterance (e.g., speech frames) from a region of memory reserved for use as an intermediate repository in which data or signals that represent speech utterances are temporarily held, while waiting to be transferred to two or more locations. The speech engine compares the spoken utterances to a list of words and phrases that are recognized by the speech engine. Because the words that are recognized comprise only keywords and/or key phrases that are each associated with or are each linked to different applications or subsystems or to the speech engines or ASRs associated with them, it is referred to as a reduced grammar, a grammar subset, or a sub-grammar that uniquely identifies different application or different subsystem and the different ASR systems associated with them. A controller receives the speech recognition results and selects one of many grammar-based ASRs to further process the speech frames using control data or control signals delivered to demultiplexing logic. The controller selects the grammar-based ASR by its vocabulary that will include at least one of the keywords or key phrases identified in a first pass. The demultiplexing logic delivers the speech frames to the selected grammar-based ASR or provides access to the speech frames that are stored in memory. The multipass technology described herein is stateless meaning the systems or processes do not monitor the details or the state of the grammar-based-ASRs. By not monitoring the details of the state, the multipass systems and processes can process commands associated with many systems or sub-systems that may respond to placing a phone call, asking a navigation system for directions, or making a multi-media selection, for example. The stateless multipass technology may process multiple words, phrases, sentences, or even several sentences without waiting for the execution or the completion of a processing of a prior spoken utterance.

FIG. 1 shows a stateless multipass system 100 that may process a spoken utterance. A converter 120 generates an analog signal or digital data that represents the spoken utterance. A region in memory or a buffer 102 holds the speech utterance and/or data that is waiting to be transferred to one or more grammar-based ASR engines 110 or 112. A grammar-based ASR engine 104 captures the speech signal dynamics by processing frames of speech input in real-time or after a programmed delay. A real-time operation may comprise an operation matching a human's perception of time or a virtual process that is processed at the same rate (or perceived to be at the same rate) as a physical or an external process. An acoustic modeling, feature extraction, and normalization match the sound parts of the frames of speech against a reduced grammar file or sub-grammar file retained in a data store 122. While shown as unitary parts of local grammar-based ASR engines 104, 110, and 112, the data store 122 may reside in a local or distributed memory, in a cloud, or a local or distributed database. The database structure may support a database sublanguage (e.g., structured query language, for example) that may be used for querying, updating, and managing data stored in a local or distributed memory of the databases. The database may be accessible through database engine or APIs between the database and grammar-based ASR engines 104, 110, and 112 that handle requests for database actions and controls database security and data integrity requirements. A cloud or cloud based computing may refer to a scalable platform that provides a combination of services including computing, durable storage of both structured and unstructured data, network connectivity and other services. The metered services provided by a cloud or cloud based computing may be interacted with (provisioned, de-provisioned, or otherwise controlled) via one of the ASR's Application Program Interfaces or APIs.

The reduced grammar file or sub-grammar file retained in the data store 122 in the grammar-based ASR 104 comprises only keywords, key phrases, and in some instances, programming logic that uniquely identifies an application process, application engine 114 or 116, a grammar-based ASR 110 or 112 associated with the application engine 114 or 116, and/or a subsystem. The application engines 114 and 116 may comprise a program or a portion thereof executed by a processor that assists in the performance or the execution of a specific task such as controlling an internal or external device or process.

In FIG. 1 selection of the grammar-based ASR engines 110 or 112 and application engines 114 and 116 associated with them may be based on a likelihood that the results returned by the grammar-based ASR engine 104 matches what the speaker said. Those likelihoods are captured through a likelihood calculation, confidence level, or confidence score (referred to as a confidence score) generated by the grammar-based ASR engine 104 and may be part of the recognition results. In some instances the confidence score represents the likelihood that the reduced grammar file or sub-grammar file matches the speech representation stored in the buffer 102.

The recognition results generated by the grammar-based ASR engine 104 may comprise text due to the speech-to-text (STT) translation that can occur in the grammar-based ASR engine 104. A demultiplexing controller 106 receives the speech recognition results that may be language agnostic and selects the best matching word or word sequence. If confidence scores do not exceed a predetermined threshold or another conflict cannot be resolved, the demultiplexing controller 106 may prompt the grammar-based ASR engine 104 to re-execute the grammar-based speech recognition. In some systems, the spoken utterances may be compared against alternate keywords and phrases that may be part of an alternate reduced grammar file or an alternate sub-grammar file. If the conflict persists, the demultiplexing controller 106 may report the conflict to the user by reporting a detection of words that are not within the multi-pass system's 100 vocabulary or may prompt the user to repeat the spoken utterance before reinitiating the processing of the system.

When the demultiplexer controller 106 selects the best matching words or word sequences it transmits control data or control signals to demultiplexing logic 108. The demultiplexing logic 108 delivers the spoken utterances (e.g., representations stored in the buffer 102) to the selected grammar-based ASR engines 110 or 112 or provides access to them. The selected grammar-based ASR engines 110 or 112, compares the spoken utterances to its vocabulary, and passes its recognition results that may include a confidence score to the application engine 114 or 116 associated with it. In an alternative system, the demultiplexing logic 108 delivers only a portion of the spoken utterance to the selected grammar-based ASR engine 110 or 112 or provides access to only a portion of the spoken utterance. The demultiplexer controller 106 may elect to transmit a portion of the spoken utterance based on a comparison of the confidence score returned by the grammar-based ASR engine 104 to a predetermined threshold.

Figure 2:
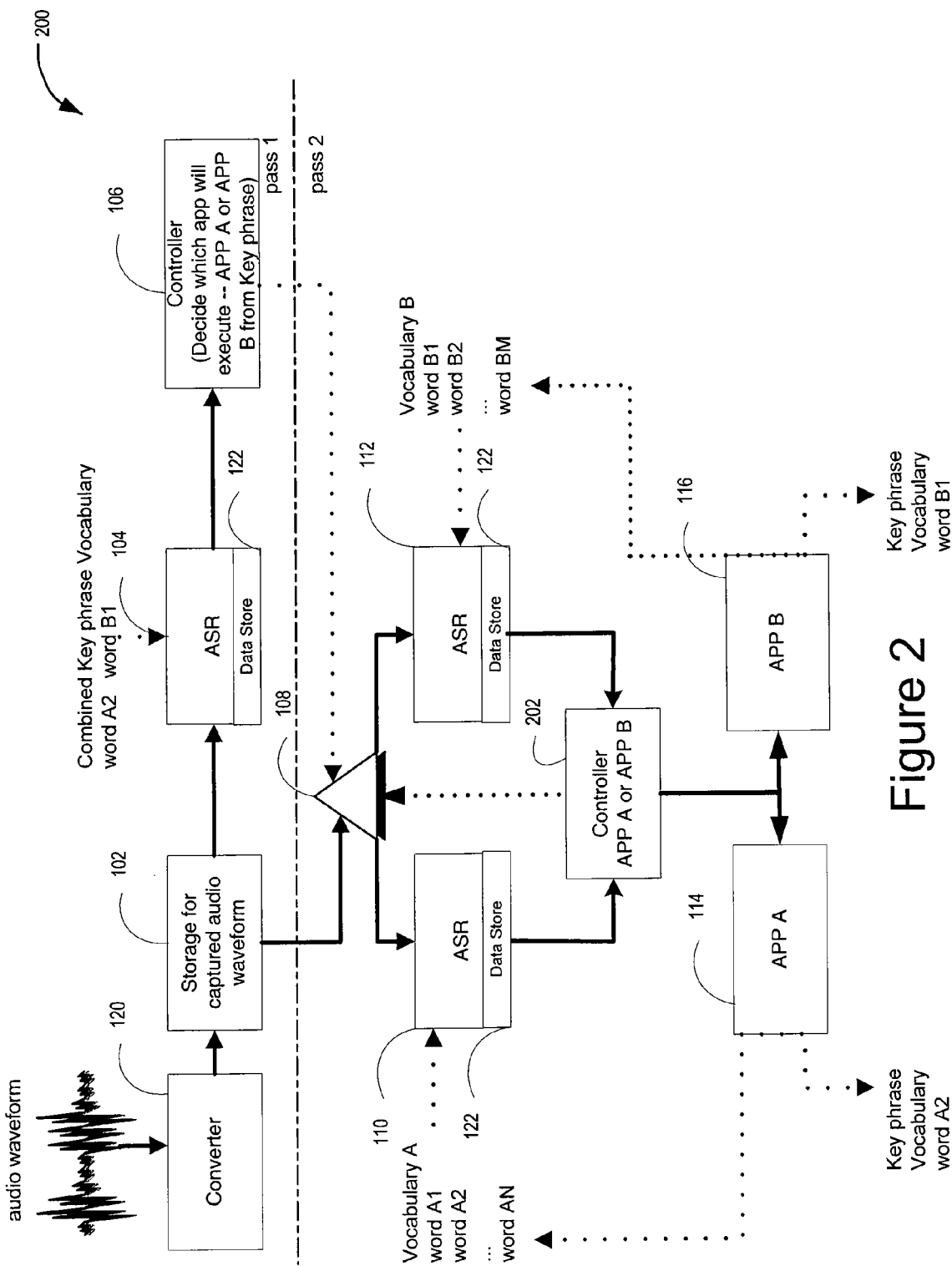
FIG. 2 is a block diagram of an alternative multipass ASR system.

In another alternative multipass ASR system 200 shown in FIG. 2 the recognition result and confidence score generated by the selected grammar-based ASR engine 110 or 112 are passed to a system management controller (SMC) 202 that may communicate with the grammar-based ASR engines 110 and 112. The system management controller 202 transmits control data or control signals to the demultiplexing logic 108 when the confidence score of the selected grammar-based ASR engines 110 and 112 do not exceed (or is below) a predetermined threshold enabling the demultiplexing logic 108 to deliver the spoken utterances to one of the remaining grammar-based ASR engines 110 or 112 shown in the second pass (also referred to as the second stage) or provides access to the spoken utterances. While two grammar-based ASR engines 110 and 112 are shown in the second stage of the alternate multipass ASR system 200, all of the multipass ASR systems 100, 200, 300, and 400 and processes 500 are scalable and may encompass any number of grammar-based ASR engines (and other ASR systems) in parallel or in a cascading architecture. In those instances selected keywords form the additional ASR vocabularies associated with those additional grammar-based ASR engines would be included in the reduced grammar file or sub-grammar file retained in the data store 122 and the system management controller 202 would select from the remaining grammar-based ASRs through a highest confidence score determined by the grammar-based ASR 104 positioned in the first pass (also referred to as the first stage). In alternate systems, other selection methods are executed.

Figure 3:
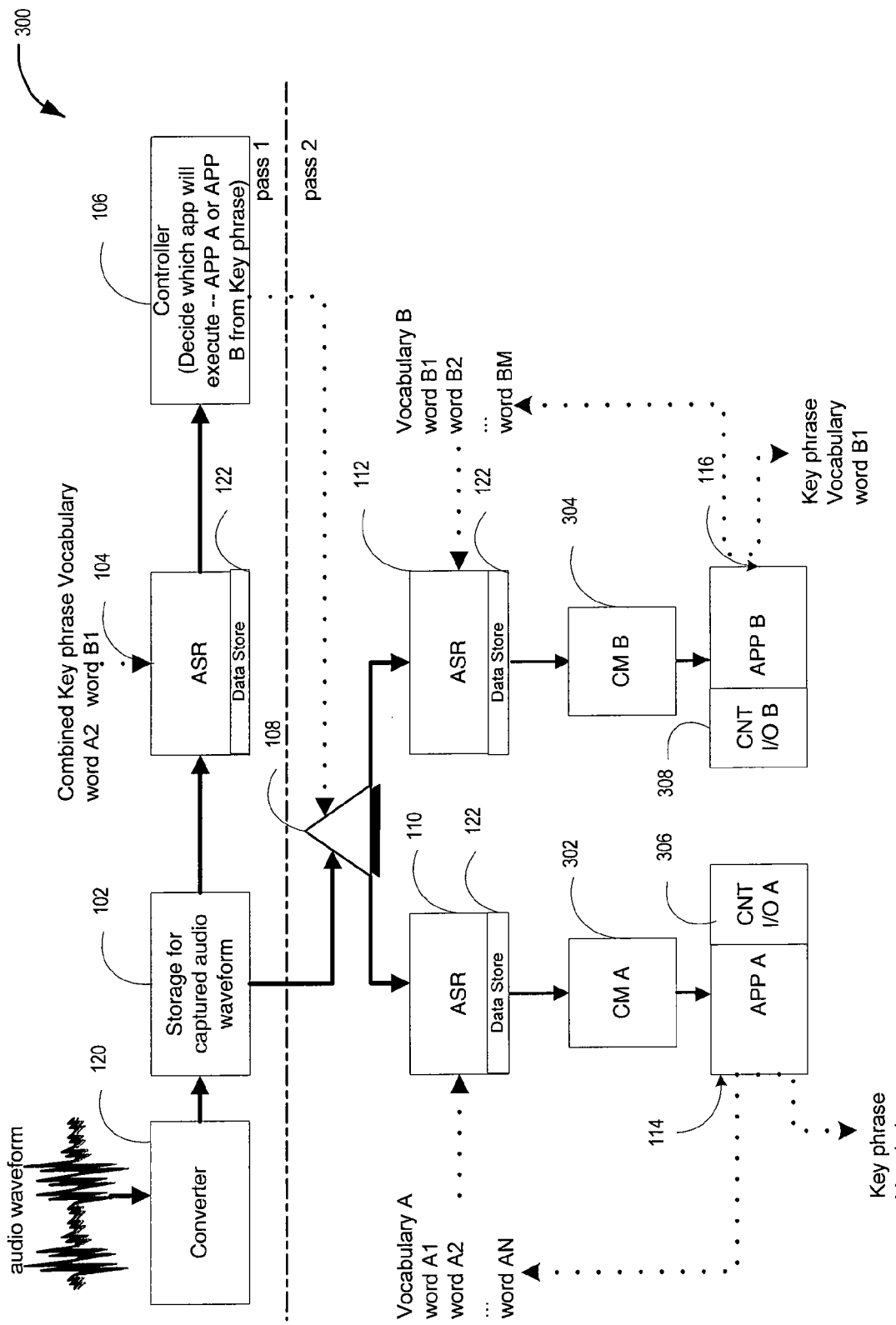
FIG. 3 is a block diagram of another alternative multipass ASR system.

In another alternative multipass ASR system 300 shown in FIG. 3 the recognition results from the grammar-based ASR engines 110 and 112 in the second stage are passed to an application control system or conversation module (CM), 302 and 304 that directly control the respective application engines 114 and 116. The CMs 302 and 304 interface a control signal input shown as "CNT I/O A" 306 and "CNT I/O B" 308. The CMs 302 and 304 provide application specific control signals (e.g., electronic signals) to the signal inputs 306 and 308 to control an internal or external device or processes that may be executed by the application engines 114 and 116. Further details and descriptions of such systems and other systems and processes that are a part of alternate multipass ASR systems and processes are described in U.S. patent application Ser. No. 13/460,443, "Post Processing of Natural Language ASR" that was filed the same day as this disclosure and is incorporated herein by reference.

Figure 4:
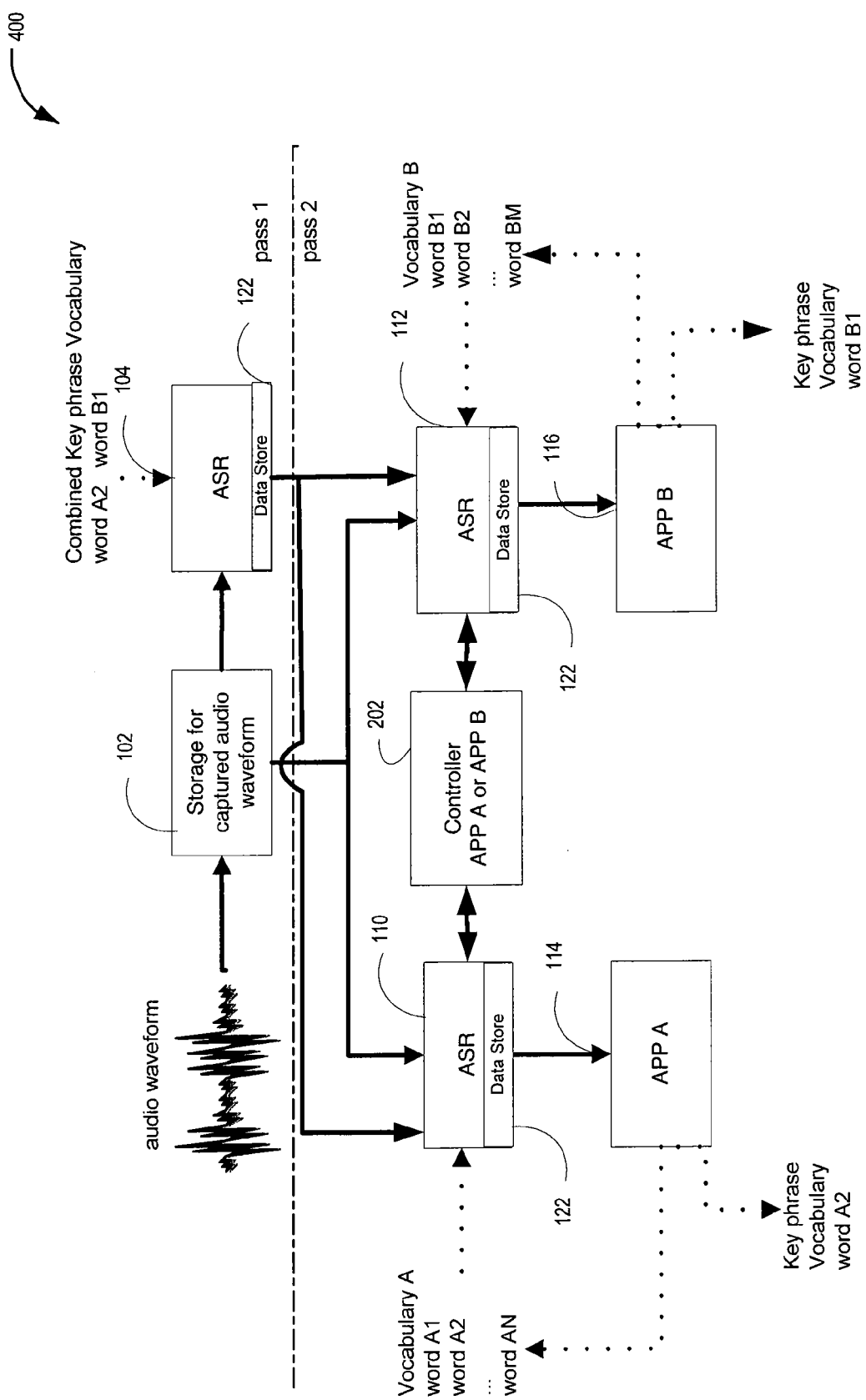
FIG. 4 is a block diagram of third alternative multipass ASR system.

In another alternative multipass ASR system 400 shown in FIG. 4 the grammar-based ASR 104 publishes its recognition result and confidence score to the grammar-based ASR engines 110 and 112 in the second stage. One or both of the grammar-based ASR engines 110 and 112 may compare the spoken utterance stored in the buffer 102 to its vocabulary and publish its recognition results to the system management controller 202. The system management controller 202 communicates with the grammar-based ASR engines 110 and 112 and determines if the spoken utterance is processed synchronously or sequentially (in real-time or after a programmed delay) and may arbitrate with the grammar-based ASR engines 110 and 112 to determine which grammar-based ASR engine 110 or 112 may published its recognition results to its respective application engines A 114 or B 116.

In yet another alternative multipass system, the grammar-based ASR 104 transmits its speech recognition results (that includes a confidence score) to the demultiplexing controller 106 and the demultiplexing logic 108, if integrated with the demultiplexing controller 106. If the confidence score does not exceed a predetermined threshold or another conflict cannot be resolved, the demultiplexing controller 106 may deliver the spoken utterances (e.g., or representations stored in the buffer 102) to all or some (a subset) of the grammar-based ASR engines in the second stage. In a variation of FIG. 1, the demultiplexing logic 108 delivers the spoken utterance to all of the grammar-based ASR engines 110 or 112 synchronously or provides them access to the speech utterances. The demultiplexing controller 106 (or a system management controller in communication with the grammar-based ASR engines 110 and 112 in an alternative implementation) arbitrates between the grammar-based ASR engines 110 and 112 to determine which grammar-based ASR engine 110 or 112 may published its recognition results to its respective application engine A 114 or B 116. Arbitration and selection may be based on any metric including 1) the speed and confidence (e.g., above a predetermined confidence score) of the second stage results; 2) frequency of occurrence and average word confidence (e.g., above a predetermined confidence score) of the second stage results; 3) a highest confidence score of the second stage results; etc. Arbitration by speed and confidence may select a recognition result that exceeds a predetermined threshold based on the order the demultiplexing controller 106 (or a system management controller) receives the second stage recognition results. A first in, first out method may be used to select the second stage recognition results that are received first and exceed a confidence score. A second arbitration method may select a result based on the frequency a second stage recognition result occurs and an average confidence score for each of the recognition results generated in this stage. Ties may be broken arbitrarily or by another scheme. A third arbitration method may select a second stage result based on the highest confidence score.

Figure 5:
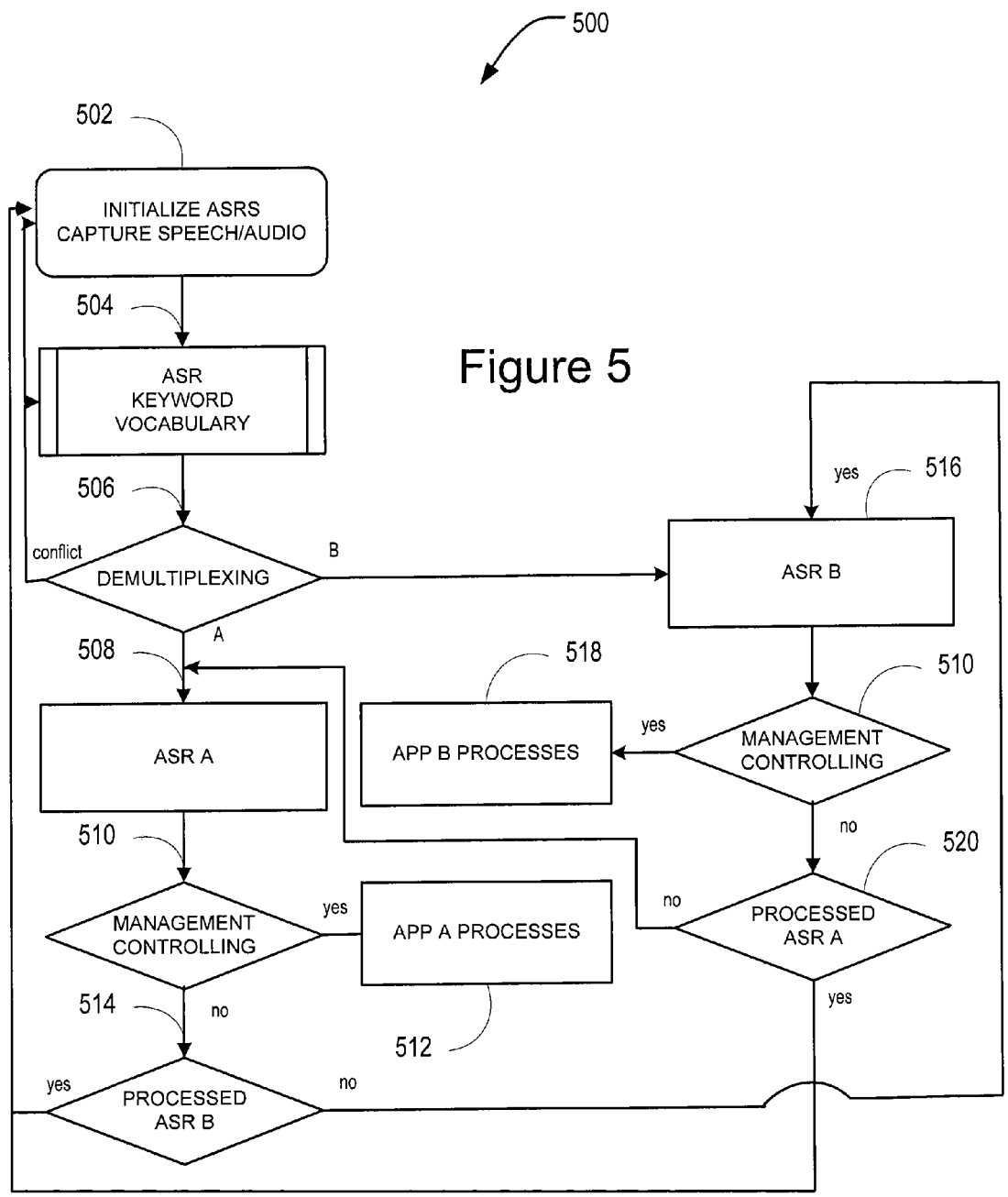
FIG. 5 is a flow diagram showing multipass-processing.

FIG. 5 is a graphical overview of a multipass processing 500. When a first stage grammar-based ASR process is on-line and is running, speech is captured, translated into analog/digital data or frames of data at 502 and a grammar-based speech engine compares the spoken utterances to a reduced grammar or sub-grammar comprising keywords, key phrases, and in some instances, programming logic that uniquely identifies an application process, application engine, a grammar-based ASR engine associated with an application engine, and/or a subsystem at 504. An application process at 512 and 518 may comprise a program or a portion thereof executed by a processor that assists in the performance or the execution of a specific task such as controlling an internal or an external device or process. The recognition results may comprise ASR agnostic indicia, symbols, objects, representations, etc. that may be further processed in that same form or format.

A demultiplexing process 506 receives the recognition results and passes the speech utterance (or access to it) to one of the ASR processes in the second stage of the process or in the second pass. If the confidence score exceeds a predetermined threshold and the recognition results of the first stage grammar-based ASR process 504 matches a word or phrase in a second stage ASR's active grammars or vocabulary, the demultiplexing process 506 passes control to that second stage grammar-based ASR process. If confidence scores do not exceed the predetermined threshold or another conflict cannot be resolved, the demultiplexing process 506 may prompt the first stage grammar-based ASR process 504 to re-execute the grammar-based speech recognition. In some systems, the spoken utterances may be compared against alternate keywords and phrases that may be part of an alternate reduced grammar or an alternate sub-grammar selected by the demultiplexing process 506. If the conflict persists, the demultiplexing process 506 may report the conflict to the user by reporting a detection of words that are not within the vocabulary of the multipass processing 500 or may prompt the user to repeat the spoken utterance and reinitiate the process at 502.

If the demultiplexing process 506 passes control to second stage grammar-based ASR process A 508, a speech engine compares the spoken utterances to its A-vocabulary, and passes the recognition results which includes a confidence score to a management controlling process 510. When the confidence score of the second stage grammar-based ASR process A 508 exceeds (or is not below) a predetermined threshold the recognition results of the second stage grammar-based ASR process A 508 is passed to the corresponding application process A at 512. When the confidence score of the second stage grammar-based ASR process A 508 does not exceed (or is below) the predetermined threshold the multipass processing 500 determines if the spoken utterance was compared to the remaining vocabularies in the multipass processing 500. In FIG. 5, the multipass processing 500 determines if the spoken utterance was compared to vocabulary B 514. If it has, the multipass processing 500 may prompt the user to repeat the spoken utterance and reinitiate the process at 502. If it hasn't, a speech engine compares the spoken utterances to its vocabulary (e.g., vocabulary B), and passes the recognition results of the second stage grammar-based ASR process B 516 which includes a confidence score to the management controlling process 510. When the confidence score of the second stage grammar-based ASR process B 516 exceeds (or is not below) a predetermined threshold the recognition results of the second stage grammar-based ASR process B 516 is passed to the corresponding application process B at 518. When the confidence score of the second stage grammar-based ASR process B does not exceed (or is below) the predetermined threshold the multipass processing 500 determines if the spoken utterance was compared to vocabulary A at 520. If it has, the multipass processing 500 may prompt the user to repeat the spoken utterance and reinitiate the process at 502. If it hasn't, the multipass processing 500 passes control to the second stage grammar-based ASR process that compares the spoken utterance to vocabulary A at 508. As described, a speech engine comprises a processor or a program that recognizes speech.

While each of the systems, engines, methods, and descriptions described may stand alone they also may be encompassed within other systems and applications. Other alternate systems may include any combinations of structure and functions described above or shown in one or more or each of the figures. These systems or methods are formed from any combination of structure and function described. The structures and functions may process additional or different input. For example, each of the systems and process described may include other instances of ASR's (e.g., natural language-based ASRs and other grammar-based ASRs), system management controllers and demultiplexers at other processes and other stages that may be structured in a hierarchal order. Moreover, some alternate processes may occur in a sequential order in real-time.

The system, engines, methods, and descriptions described may also be programmed in one or more controllers, devices, signal processors, and one or more processors and a coprocessor (e.g., a coprocessor is a processor distinct from a main processor, that performs additional functions to assist the main processor). The processors may be arranged in a parallel processing structure and/or multiprocessing structure. Parallel processing may run on a computer containing two or more processors running simultaneously. Parallel processing differs from multiprocessing in the way a task may be distributed. In multiprocessing, one processor may manage the conversion of spoken frames into analog data, another may manage the first stage grammar-based ASR engines, and a third may manage the second stage grammar-based ASR engines. Alternatively, each of the engines and controllers (e.g., grammar-based ASR engines, application engine, demultiplexing controller, system management controller, application controller, etc.) described herein may run on virtual machines in which one, two, etc. or all of the engines are isolated on a complete system platform that supports the execution of a complete operating system (OS). The virtual machines may be limited to the resource and abstractions provided by the particular virtual machine. Some virtual machines may not break out of their isolated virtual worlds to access more resources. In yet another alternative, the grammar-based ASR engines, application engines, demultiplexing controller, system management controller, application controller, other ASRs etc., may be executed by a multitasking processor executing multiple computer threads (e.g., multithreading). In yet another alternative, each of the ASR's may be executed by a single speech engine (e.g., single ASR system) that compares a spoken utterance to different vocabularies. The vocabularies may comprise all of the active grammar words and phrases. Thus, if an exemplary FIG. 1 were implemented by one ASR speech engine, the speech engine would access three vocabularies: 1) a reduced grammar or sub-grammar vocabulary; 2) vocabulary A; and 3) vocabulary B. Logic interfaced to or a unitary part of the ASR speech engine may activate or deactivate the words (e.g., by rules within the grammar) and/or phrases that comprise the grammars, implement the demultiplexer or device that accesses the spoken utterance through one input and selects one of many outputs to deliver the spoken utterance or provide access to it, and implement the system management controller.

The engines may comprise a processor or a portion of a program that executes or supports an ASR system or process. The processor may comprise one, two, or more central processing units that execute the instruction code, mine speech data, and access data from memory that generate, support, and/or complete an operation, compression, or signal modifications. The ASR applications may support and define the functions of a processor that is customized by instruction code (and in some applications may be resident to any ASR enabled systems that may include vehicles, communication systems, medical systems, audio systems, telephones, teleconferencing systems, etc.). In some systems, a front-end processor may perform the complementary tasks of capturing audio or speech for a processor or program to work with, and for making the audio files and results available to back-end ASR processors, controllers, engines, or devices.

In some applications, the systems, methods, engines, and descriptions may be encoded in a non-transitory signal bearing storage medium, a computer-readable medium, or may comprise logic stored in a memory that may be accessible through an interface and is executable by one or more processors. Some signal-bearing storage medium or computer-readable medium comprise a memory that is unitary or separate (e.g., local or remote) from ASR enabled devices such as such as cell phones, wireless phones, personal digital assistants, two-way pagers, smartphones, portable computers, vehicle based devices, medical diagnostic systems, medical record systems, and any other devices that interface or include ASR technology. If the descriptions or methods are performed by software, the software or logic may reside in a memory resident to or interfaced to the one or more processors, devices, or controllers that may support a tangible or visual communication interface (e.g., to a display), wireless communication interface, or a wireless system.

The memory may retain an ordered listing of executable instructions for implementing logical functions. A logical function may be implemented through digital circuitry, through source code, or through analog circuitry. A "computer-readable storage medium," "machine-readable medium," "propagated-signal" medium, and/or "signal-bearing medium" may comprise a non-transitory medium that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a memory or database accessible by a database engine that provides access to a database management system. When such devices are responsive to such commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action "(i.e., the device's response) to . . . " merely follow another action.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

What is claimed is:

1. A multipass processing system comprising:
   a first grammar-based speech recognition system that compares a spoken utterance to a sub-grammar comprising keywords or key phrases from active grammars of a plurality of other grammar-based speech recognition systems and each of the keywords or key phrases uniquely identifies one of a plurality of application engines and an associated one of the plurality of other grammar-based speech recognition systems, to generate a first grammar-based speech recognition result and a first grammar-based confidence score;
   a demultiplexer that receives the spoken utterance through an input and transmits the spoken utterance to a selected one of the plurality of other grammar-based speech recognition systems wherein the selection of the other grammar-based speech recognition system is based on the first grammar-based speech recognition result, and wherein the selected one of the plurality of other grammar-based speech recognition systems generates a second grammar-based speech recognition result and a second confidence score; and
   a system management controller communicatively coupled to the plurality of other grammar-based speech recognition systems, which receives the second grammar-based speech recognition result and the second confidence score and enables forwarding of the spoken utterance from the demultiplexer to a second one of the plurality of the other grammar-based speech recognition systems in instances when the second confidence score does not exceed a predetermined threshold.

2. The multipass processing system of claim 1 where the plurality of other grammar based speech recognition systems are configured to compare the spoken utterance to a vocabulary that includes at least one keyword or key phrase of the sub-grammar.

3. The multipass processing system of claim 1 where the first grammar-based speech recognition-result comprises text.

4. The multipass processing system of claim 1 further comprising a second sub-grammar comprising other keywords or other key phrases from the active grammars where the first grammar-based speech recognition system compares the spoken utterance to the second sub-grammar when the first-grammar based confidence score does not exceed a predetermined threshold.

5. The multipass processing system of claim 4 where the demultiplexer executes a comparison between the first grammar-based confidence score and the predetermined threshold and prompts the first grammar-based speech recognition system to compare the spoken utterance to the second sub-grammar.

6. The multipass processing system of claim 1 wherein the system management controller communicates and arbitrates with a plurality of the plurality of other grammar-based speech recognition systems based on results received from the plurality of the plurality of other grammar-based speech recognition systems to determine which of the plurality of the plurality of other grammar-based speech recognition systems publishes its speech recognition result to a respective application engine.

7. The multipass processing system of claim 1 further comprising a plurality of application control systems that directly control the plurality of application engines by transmitting electronic signals to the signal inputs of the plurality of application engines.

8. The multipass processing system of claim 1 where the first grammar-based speech recognition result comprises a language agnostic output.

9. The multipass processing system of claim 1 where the spoken utterance comprises a converted frame of data.

10. The multipass processing system of claim 1 where the first grammar-based speech recognition system, the demultiplexer, and the plurality of other grammar-based speech recognition systems comprise a plurality of stateless devices or stateless systems.

11. The multipass processing system of claim 1 where the first grammar-based speech recognition system, the demultiplexer, and one of the plurality of other grammar-based speech recognition systems process the same spoken utterance.

12. The multipass processing system of claim 1 where the first grammar-based speech recognition system, the demultiplexer, and one of the plurality of other grammar-based speech recognition systems process the same spoken utterance in a sequential order.

13. The multipass processing system of claim 1 where the demultiplexer comprises a demultiplexer controller that transmits control signals and a demultiplexing logic remote from the demultiplexer controller that transmits the spoken utterance to one of the plurality of other grammar-based speech recognition systems.

14. The multipass processing system of claim 1 where each of the first grammar-based speech recognition systems, the demultiplexer, and the plurality of other grammar-based speech recognition systems comprise a separate computing thread executed by one processor.

15. The multipass processing system of claim 1 where each of the first grammar-based speech recognition system, the demultiplexer, and the plurality of other grammar-based speech recognition systems are executed by a plurality of parallel processors.

16. The multipass processing system of claim 1 where the grammar-based speech recognition system comprises
   a natural language-based speech recognition system that compares the spoken utterance to a natural language vocabulary to generate a natural language speech recognition result and a natural language confidence score; and
   a master conversation module engine that compares the natural language speech recognition result generated by the natural language-based speech processing system to a plurality of selected words that are each mapped to one of a plurality of domain specific words and phrases to generate the first grammar-based speech recognition result and the first grammar-based confidence score.

17. A computer implemented method of automatically recognizing speech comprising:
   capturing a speech utterance by converting frames of spoken utterances into electronic signals;
   recognizing the speech utterance by comparing the frames of speech to a sub-grammar comprising keywords or key phrases from active grammars of a plurality of other grammar-based speech recognition systems and each of the keywords or key phrases uniquely identifies one of a plurality of application engines and an associated one of the plurality of other grammar-based speech recognition systems;
   generating a first grammar-based speech recognition result and a first grammar-based confidence score;

comparing the first grammar-based confidence score to a predetermined threshold;

forwarding the frames of speech to a selected one of the plurality of other grammar-based speech recognition systems wherein the selection of the other grammar-based speech recognition system is based on the results of the comparison, and wherein the selected one of the plurality of other grammar-based speech recognition systems generates a second grammar-based speech recognition result and a second confidence score; and forwarding of the spoken utterance to a second one of the plurality of the other grammar-based speech recognition systems when the second confidence score does not exceed a predetermined threshold.

18. The computer implemented method of claim 17 further comprising comparing the spoken utterance to a second sub-grammar comprising other keywords or other key phrases from the active grammars.

19. The computer implemented method of claim 17 where the method of automatically recognizing speech comprises a stateless process.

20. A computer implemented method comprising:

capturing speech utterance by converting frames of spoken utterances into electronic signals;

recognizing the speech utterance by comparing the frames of speech to a sub-grammar comprising keywords or key phrases from active grammars of a plurality of other grammar-based speech recognition systems and each of the keywords or key phrases uniquely identifies one of a plurality of application engines and an associated one of the plurality of other grammar-based speech recognition systems;

generating a first grammar-based speech recognition result and a first grammar-based confidence score;

comparing the first grammar-based confidence score to a predetermined threshold; and forwarding the frames of speech to a selected one of the plurality of other grammar-based speech recognition systems wherein the selection of the other grammar-based speech recognition system is based on the results of the comparison, and wherein the selected one of the plurality of other grammar-based speech recognition systems generates a second grammar-based speech recognition result and a second confidence score; and forwarding of the frames of speech to a second one of the plurality of the other grammar-based speech recognition systems when the second confidence score does not exceed a predetermined threshold.

21. The method of claim 20 where the acts of capturing the speech utterance, recognizing the speech utterance, generating the first grammar-based speech recognition result, comparing the first grammar-based confidence score, and forwarding the frames of speech occur in a sequential order in real-time.

* * * * *